United States Patent
Fan et al.

(10) Patent No.: US 6,918,963 B2
(45) Date of Patent: Jul. 19, 2005

(54) METHOD AND APPARATUS FOR COATING ELECTROLUMINESCENT PHOSPHORS

(75) Inventors: Chen-Wen Fan, Sayre, PA (US); Dale E. Benjamin, Athens, PA (US)

(73) Assignee: Osram Sylvania Inc., Danvers, MA (US)

( * ) Notice: Subject to any disclaimer, the term of this patent is extended or adjusted under 35 U.S.C. 154(b) by 1 day.

(21) Appl. No.: 10/767,245

(22) Filed: Jan. 29, 2004

(65) Prior Publication Data

US 2004/0182317 A1 Sep. 23, 2004

Related U.S. Application Data

(62) Division of application No. 09/963,964, filed on Sep. 26, 2001, now Pat. No. 6,733,826.
(60) Provisional application No. 60/256,194, filed on Dec. 18, 2000.

(51) Int. Cl.[7] .................... C16C 16/00; C23C 16/442
(52) U.S. Cl. ............................. 118/716; 118/DIG. 5
(58) Field of Search ............................ 118/716, DIG. 5

(56) References Cited

U.S. PATENT DOCUMENTS

| | | | | |
|---|---|---|---|---|
| 3,152,005 A | * | 10/1964 | Tuttle ........................ 427/213 |
| 4,585,673 A | * | 4/1986 | Sigai ......................... 427/213 |
| 5,080,928 A | * | 1/1992 | Klinedinst et al. ............ 427/70 |
| 5,985,175 A | * | 11/1999 | Fan et al. ............. 252/301.4 R |
| 6,064,150 A | * | 5/2000 | Klinedinst et al. .......... 313/503 |
| 6,171,650 B1 | * | 1/2001 | Gingerich et al. .......... 427/215 |
| 6,364,951 B1 | * | 4/2002 | Gingerich et al. .......... 118/303 |
| 6,428,861 B2 | * | 8/2002 | France et al. ............... 427/488 |
| 6,733,826 B2 | * | 5/2004 | Fan et al. ................... 427/213 |
| 6,827,786 B2 | * | 12/2004 | Lord .......................... 118/716 |
| 2002/0076483 A1 | * | 6/2002 | Fan et al. ..................... 427/64 |
| 2003/0064151 A1 | * | 4/2003 | Klinedinst .................. 427/212 |
| 2004/0182317 A1 | * | 9/2004 | Fan et al. ................... 118/716 |

* cited by examiner

*Primary Examiner*—Jeffrie R. Lund
(74) *Attorney, Agent, or Firm*—Robert F. Clark

(57) ABSTRACT

A process for preparing particles of zinc sulfide-based electroluminescent phosphor having a moisture resistant coating thereon which comprises the steps of selecting a reaction vessel having a given height and a porous disc at the bottom thereof; charging the reaction vessel with phosphor particles and fluidizing the particles by introducing an inert gas into the vessel through the porous disc; heating the reaction vessel to a reaction temperature; introducing a coating precursor into the reaction vessel at a position adjacent the bottom of the vessel but above the disc; introducing a co-reactant into the reaction vessel at a position substantially mid-way of the given height; and maintaining the inert gas flow, the precursor flow and the co-reactant flow for a time sufficient for a reaction to occur and coat the phosphor with the moisture resistant coating. Apparatus for carrying out the process is also disclosed.

3 Claims, 1 Drawing Sheet

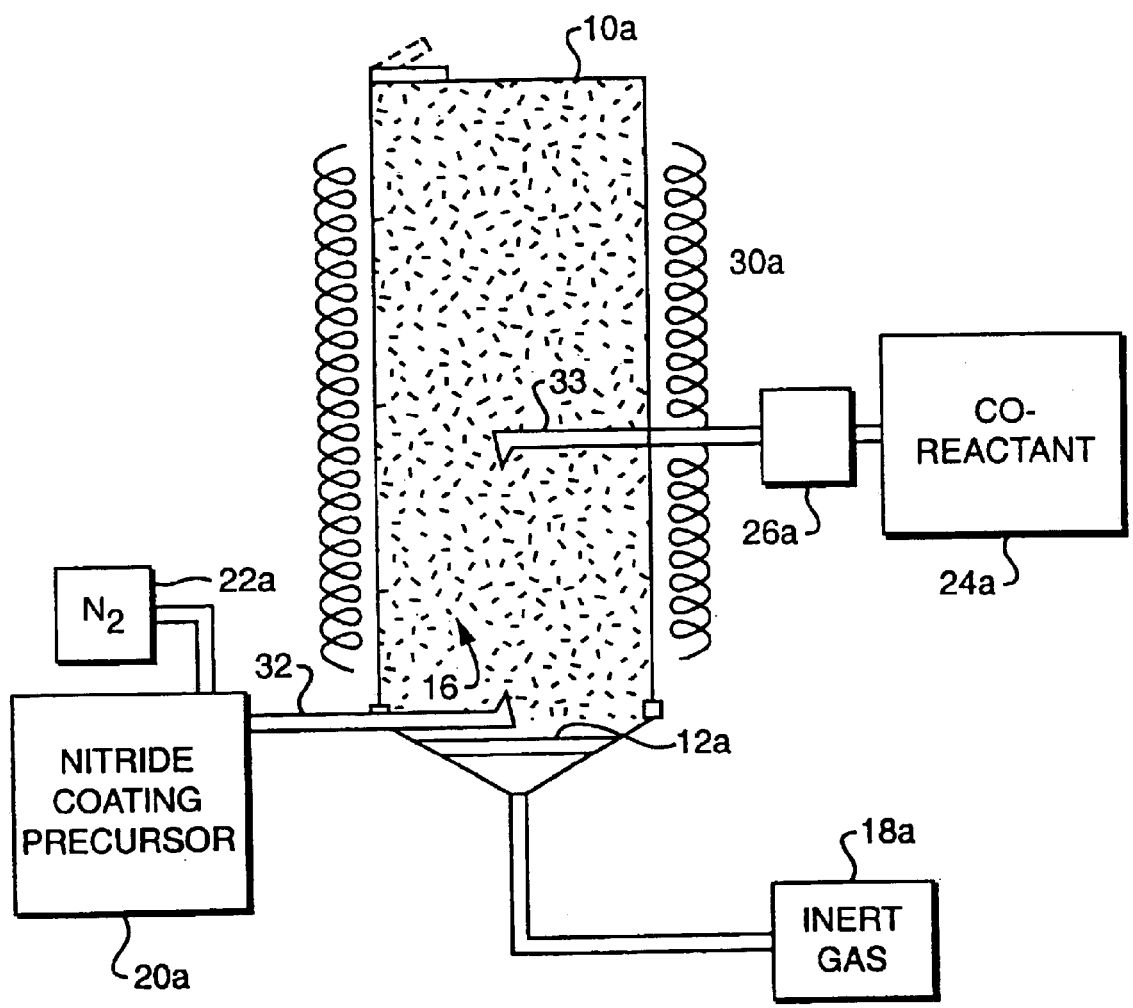

METHOD AND APPARATUS FOR COATING ELECTROLUMINESCENT PHOSPHORS

CROSS REFERENCES TO RELATED APPLICATIONS

This application is a division of application Ser. No. 09/963,964, filed Sep. 26, 2001 now U.S. Pat. No. 6,733,826, which claims the benefit of U.S. Provisional Application No. 60/256,194, filed Dec. 18, 2000.

TECHNICAL FIELD

This invention relates to zinc sulfide-based electroluminescent phosphors and more particularly to a method and apparatus for coating such phosphors with a moisture inhibiting coating.

Still more particularly, it relates to a method and apparatus for making such phosphors in commercial quantities.

BACKGROUND ART

It is known from U.S. Pat. No. 6,064,150 that a coating of aluminum nitride or aluminum nitride amine on an electroluminescent phosphor particle allows the manufacture of electroluminescent light sources having good life characteristics. It is also known to coat such phosphors with a metal oxide hydroxide.

It would be an advance in the art if such coatings could be applied to large batches of phosphor materials.

DISCLOSURE OF INVENTION

It is, therefore, an object of this invention to obviate the disadvantages of the prior art.

It is another object of the invention to enhance the manufacture of commercial quantities of coated electroluminescent phosphors.

These objects are accomplished, in one aspect of the invention, by a process for preparing particles of zinc sulfide-based electroluminescent phosphor having a moisture resistant coating thereon which comprises the steps of selecting a reaction vessel having a given height and a porous disc at the bottom thereof; charging the reaction vessel with phosphor particles and fluidizing the particles by introducing an inert gas into the vessel through the porous disc; heating the reaction vessel to a reaction temperature; introducing a coating precursor into the reaction vessel at a position adjacent the bottom of the vessel but above the disc; introducing a co-reactant into the reaction vessel at a position substantially mid-way of the given height; and maintaining the inert gas flow, the precursor flow and the co-reactant flow for a time sufficient for a reaction to occur and coat the phosphor with the moisture resistant coating.

The apparatus for manufacturing commercial quantities of zinc sulfide-based electroluminescent phosphor having a moisture resistant coating thereon, comprises a reaction vessel having a given height and a porous disc at the bottom thereof, a supply of phosphor particles within the vessel; a first supply of an inert gas for fluidizing the particles, the first supply of inert gas entering the vessel through the porous disc; a heater surrounding the reaction vessel for heating the reaction vessel to a reaction temperature; a supply of a coating precursor; first means for conducting the coating precursor from the supply to the reaction vessel, the first means entering the reaction vessel at the bottom of the vessel at a position above the porous disc; a supply of a co-reactant; and a second means for conducting the co-reactant from the supply to the reaction vessel, the second means entering the reaction vessel at a position substantially mid-way of the given height.

This method and apparatus allows for the commercial production of sizeable quantities of coated electroluminescent phosphor.

BRIEF DESCRIPTION OF THE DRAWINGS

The single FIGURE is a diagrammatic illustration of the apparatus of the invention.

BEST MODE FOR CARRYING OUT THE INVENTION

For a better understanding of the present invention, together with other and further objects, advantages and capabilities thereof, reference is made to the following disclosure and appended claims in conjunction with the above-described drawings.

Referring now to the drawings with greater particularity, there is shown in the figure a reaction vessel 10a that is preferably formed of stainless steel having a diameter of greater than 6 inches, a height of about 6 feet and a capacity of greater than 50 kilograms. In a preferred embodiment, the vessel 10a has a diameter between 10 and 12 inches, a height of 6 feet and a capacity of greater than 150 kilograms. In actuality, capacities of more than 300 kilograms are possible. The vessel 10a is surrounded by a suitable heater 30a that is capable of bringing the reaction vessel 10a to coating temperature between 150 and 225° C. The coating precursor, which can be hexakis(dimethylamido)dialuminum, is fed from a supply 20a after entrainment with nitrogen from a supply 22a thereof, through tube 32 into the vessel 10a. The entrance of tube 32 into vessel 10a is at a point about 1.0 cm above a porous disc 12a. The tube 32 has a narrow tip within the vessel 10a, the tip being located in the center of the reaction vessel.

The co-reactant, which can be diluted anhydrous ammonia, is fed from a supply 24a into the side of the reaction vessel 10a, via a tube 33, at a point substantially mid-way of the height. Tube 33 has a narrow opening slit that is located in the center of vessel 10a. The co-reactant can pass through a Unit mass controller 26a prior to entering the vessel 10a. Dilution can be accomplished by adding purified nitrogen.

A supply of inert gas 18a such as nitrogen is provided for fluidizing the phosphor particles 16. The inert gas is fed from the bottom of the reaction vessel 10a, through the porous disc 12a, thus ensuring a good fluidization of the particles.

This process and apparatus solve the problems of the prior art technique wherein the precursors, such as the above-cited hexakis(dimethylamido)dialuminum were charged into the reaction vessel through the porous disc 12a. It has been found that the relatively extreme reactivity of the precursor caused a nitride-plating reaction to occur within the pores of the disc 12a, soon plugging the holes in the disc and stopping the desired reaction. This occurs even more rapidly because of the elevated temperatures of the reaction vessel, which are between 150 and 225° C.

By charging the precursor into the reaction vessel above the porous disc the plating problem is eliminated. Also, by feeding the nitride precursor from the side instead of from the top of the reaction vessel, as did the prior art, the precursor is exposed for a shorter time inside the hot vessel. Additionally, this reaction vessel design can be utilized with other coating processes, such as the reaction of trimethylaluminum with oxygen and ozone. Feeding an oxygen-ozone mixture from the side of the vessel instead of from the top extends the life of the very reactive ozone within the vessel allowing greater coating potential.

While there have been shown and described what are at present considered to be the preferred embodiments of the invention, it will be apparent to those skilled in the art that various changes and modification can be made herein without departing from the scope of the invention as defined by the appended claims.

What is claimed is:

1. An apparatus for manufacturing commercial quantities of zinc sulfide-based electroluminescent phosphor having a moisture resistant coating thereon, said apparatus comprising:

a reaction vessel having a given height and a porous disc at the bottom thereof;

a supply of phosphor particles within said vessel;

a first supply of an inert gas for fluidizing said particles, said first supply of inert gas entering said vessel through said porous disc;

a heater surrounding said reaction vessel for heating said reaction vessel to a reaction temperature;

a supply of a coating precursor;

first means for conducting said coating precursor from said supply to said reaction vessel, said first means entering said reaction vessel at said bottom of said vessel at a position above said porous disc;

a supply of a co-reactant; and a second means for conducting said co-reactant from said supply to said reaction vessel, said second means entering said reaction vessel at a position substantially mid-way of said given height.

2. The apparatus of claim 1 wherein said reaction vessel has a diameter of 6 to 12 inches.

3. The apparatus of claim 2 wherein said reaction vessel is stainless steel.

* * * * *